United States Patent
Dunahoo et al.

(10) Patent No.: US 12,202,081 B2
(45) Date of Patent: Jan. 21, 2025

(54) WELDING POWER SUPPLIES AND METHOD FOR COMPLETED CIRCUIT TESTING PROCESS

(71) Applicant: Illinois Tool Works Inc., Glenview, IL (US)

(72) Inventors: Jason Dunahoo, De Pere, WI (US); Caleb Rosera, Glenview, IL (US); Andrew Nelson, Appleton, WI (US)

(73) Assignee: Illinois Tool Works Inc.

( * ) Notice: Subject to any disclaimer, the term of this patent is extended or adjusted under 35 U.S.C. 154(b) by 551 days.

(21) Appl. No.: 16/984,823

(22) Filed: Aug. 4, 2020

(65) Prior Publication Data

US 2021/0060682 A1    Mar. 4, 2021

Related U.S. Application Data

(60) Provisional application No. 62/894,256, filed on Aug. 30, 2019.

(51) Int. Cl.
| | |
|---|---|
| *B23K 9/095* | (2006.01) |
| *B23K 9/10* | (2006.01) |
| *B23K 9/16* | (2006.01) |

(52) U.S. Cl.
CPC .......... *B23K 9/0953* (2013.01); *B23K 9/0956* (2013.01); *B23K 9/1062* (2013.01); *B23K 9/16* (2013.01)

(58) Field of Classification Search
CPC .. B23K 9/0953; B23K 9/0956; B23K 9/1062; B23K 9/16
See application file for complete search history.

(56) References Cited

U.S. PATENT DOCUMENTS

| | | | | |
|---|---|---|---|---|
| 4,492,841 A | * | 1/1985 | Delius | B23K 9/073 |
| | | | | 219/130.33 |
| 6,166,350 A | * | 12/2000 | Sickels | B23K 9/133 |
| | | | | 219/137.71 |

(Continued)

FOREIGN PATENT DOCUMENTS

EP    2640543    9/2013

OTHER PUBLICATIONS

European Office Action ApplN No. 20192765.4 dated Feb. 10, 2021.
Yang et al., "Electric Arc Welding Basics", Harbin Institute of Technology Press, Feb. 28, 2023, p. 148.

*Primary Examiner* — Nathaniel E Wiehe
*Assistant Examiner* — Keith Brian Assante
(74) *Attorney, Agent, or Firm* — MCANDREWS HELD & MALLOY LTD.

(57) ABSTRACT

Disclosed are welding systems and methods for conducting a completed circuit testing process. The welding system includes a power source to deliver power via one or more power outlets. Control circuitry receives an input to initiate a welding process and to command the power source to deliver a power signal with a current below a threshold level. The control circuitry monitors characteristics of the power signal at the one or more power outlets and determines whether a completed circuit condition exists. The control circuitry performs this determination based on information obtained through monitoring the characteristics of the power signal. The control circuitry controls the power source to prevent delivery of power if a completed circuit condition exists.

20 Claims, 6 Drawing Sheets

(56) References Cited

U.S. PATENT DOCUMENTS

| | | | |
|---|---|---|---|
| 6,707,001 B1* | 3/2004 | Ulrich | B23K 9/10 219/130.21 |
| 2006/0027545 A1 | 2/2006 | Stava | |
| 2015/0174681 A1* | 6/2015 | Flood | B23K 9/1087 219/133 |
| 2018/0126477 A1* | 5/2018 | Kooken | B23K 9/1336 |
| 2018/0354050 A1* | 12/2018 | DeCoster | B23K 9/133 |
| 2018/0367050 A1* | 12/2018 | Mnich | B23K 9/0956 |

* cited by examiner

WELDING POWER SUPPLIES AND METHOD FOR COMPLETED CIRCUIT TESTING PROCESS

CROSS REFERENCE TO RELATED APPLICATIONS

This application is a Non-Provisional patent application that claims priority to U.S. Provisional Patent Application No. 62/894,256, entitled "Welding Power Supplies And Method For Completed Circuit Testing Process", filed Aug. 30, 2019, the contents of which are herein incorporated by reference in their entirety.

BACKGROUND

This disclosure relates generally to welding systems and, more particularly, to welding power supplies and methods for completed circuit testing processes.

Conventional welding systems and/or power supplies may allow an operator to employ multiple types of tools and/or welding processes. In so doing, the operator may transition from one welding tool to another, often in the middle of a workspace and/or during a welding process. However, if a tool is changed while power is output with a high current is on or being turned on, the tool and/or workpiece may be damaged. Thus, systems or methods to prevent unintentional damage to the tool and/or workpiece is desirable.

SUMMARY

Welding power supplies and methods for a completed circuit testing process are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Where appropriate, similar or identical reference numbers are used to refer to similar or identical components.

DETAILED DESCRIPTION

Figure 1A:
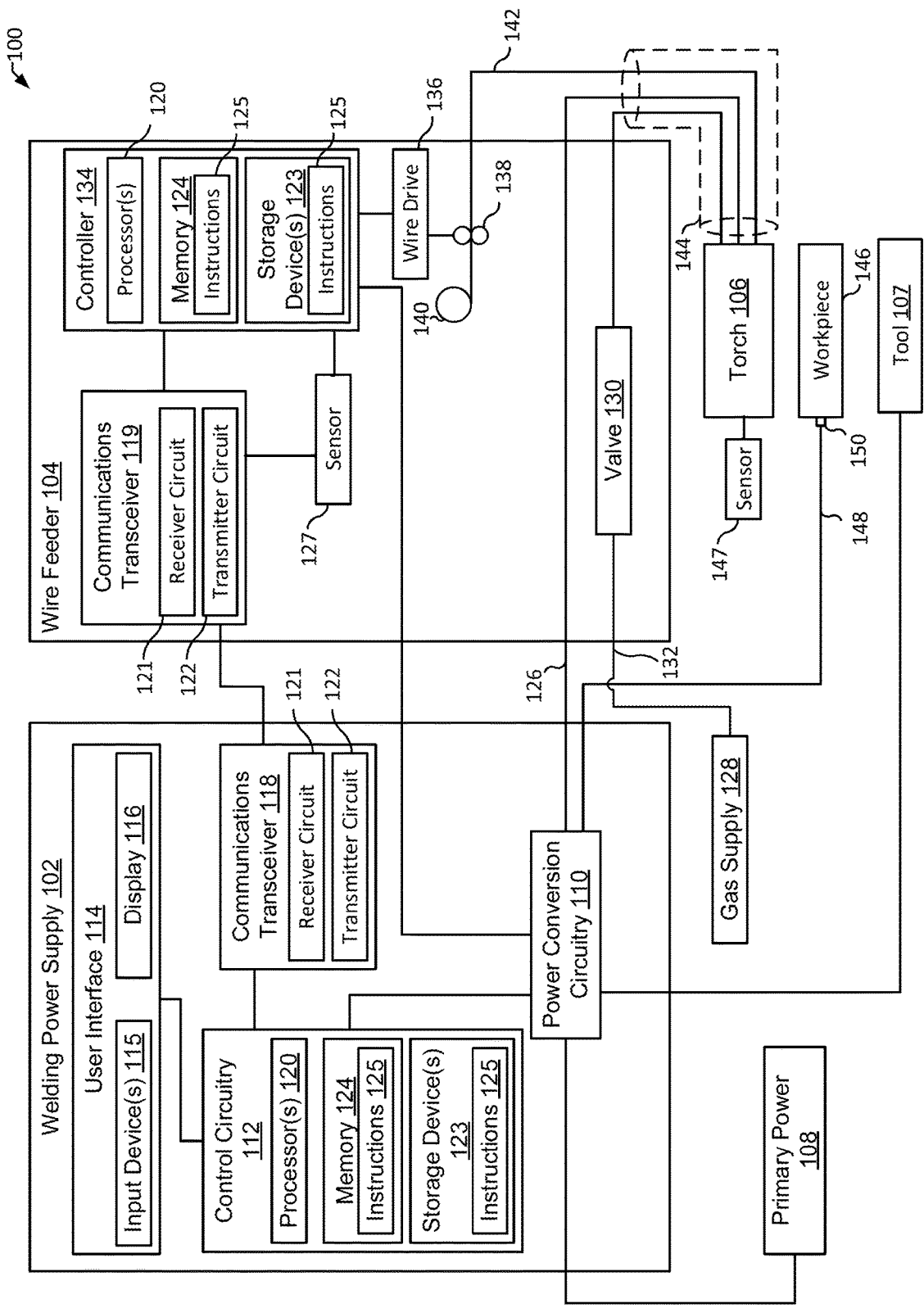
FIG. 1A is a schematic diagram of an example welding system including a power supply and a wire feeder, in accordance with aspects of this disclosure.

Disclosed are example welding systems and methods to deliver power via one or more power outlets to conduct a completed circuit testing process. Generally, this disclosure relates to systems and methods for one or more testing techniques and/or processes to determine if a completed circuit is present in one or more leads (e.g., a short circuit; a shorted weld cable or lead; electrical contact between an electrode and a conductive structure; an exposed conductor and/or conductive pathway; etc.). In disclosed examples, the system is configured to generate and monitor one or more outputs to check for completed circuits in a weld cable and/or tool prior to changing a welding process, changing a welding tool, and/or changing a part of a welding tool (e.g., changing the torch contact tip, etc.). Performing a check for shorted leads before, at or during a process switch to prevent potential damage to the welding tool and/or the welding workpiece from exposure to unintentional current paths (e.g., from MIG or GTAW welding torches, gouging tools, plasma cutters, etc.).

In some examples, if a completed circuit condition is determined, a user notification of the condition is provided to the operator. This provides the operator with an opportunity to correct any issues before proceeding with a welding process, and mitigating any damage as a result. Additionally or alternatively, the controller automatically prevents one or more power outputs (e.g., turning off the power supply, redirecting power output from the identified power outlet, activating an interlock, etc.), thereby automatically preventing damage. Advantageously, disclosed examples perform the completed circuit check without the use of additional circuitry, thereby minimizing cost and complexity.

The system includes control circuitry that is configured to receive an input to initiate a welding process, and also to command the power source to deliver a power signal with a current below a threshold level. The control circuitry may monitor one or more characteristics of the power signal at the one or more power outlets, and the control circuitry also determines whether a completed circuit or an open circuit condition exists. The control circuitry performs this determination based on the information obtained through monitoring one or more characteristics of the power signal. The control circuitry may also control the power source to prevent delivery of power (e.g., by disabling the power supply, diverting power from the associated power outlet, activating an interlock, etc.) if a completed circuit condition exists.

As disclosed herein with respect to the several figures, the welding system includes a limited energy completed circuit output check, for example, before, at or during a process changeover to check for unintentional current paths and to prevent power output from causing damage. For example, an unintentional current path may be exposed and result in an undesirable completed circuit. The current can flow from a welding torch electrode being placed on a workpiece or in close proximity, resulting in arcing. Further, an exposed conductor (e.g., such as a damage weld cable) may unintentionally make electrical contact with a grounded conductor. The prospect of an unintentional completed circuit increases when the process changeover is from a tool that employs an operator-activated trigger to enable output power (such as a MIG torch) to a tool that is constantly or near constantly outputting power (such as a gouging torch).

In some examples, the detection of a completed circuit is accomplished through monitoring of the main power source (e.g., a switched mode power supply or power inverter) only, without employing additional and/or dedicated circuitry designed for the task. Additionally or alternatively, the operator is notified of the completed circuit (e.g., shorted-lead) condition so corrective measures can be taken. This same logic of shorted output check and notification could be applied at power up to prevent similar damage when powering-up a machine in such a process.

Generally, it is advantageous, during the transition from one welding process to another welding process, or during the process of changing cables or changing tool heads and torches, that no current should be flowing before the operator initiates a welding process. In some systems, a process changeover is initiated by activating a selection switch, such as a manual process selection switch (e.g., knob, button, digital touchscreen interface, etc.). However, in some examples, the selection switch is an automatically activated switch and/or a software controlled switch. Both the software based switch and the hardware switch may be manual or may be automatic. In each scenario, the switch may be activated during the process of changing cables, tools, tool heads or torches.

In some examples, a welding system may accept multiple welding torches, and/or multiple welding-type tools, which may be connected to the system via one or more interchangeable cables, outlets, etc. The selection switch is used to transition the system to the desired welding-type setting. In some examples, a standby mode or a tool change mode may exist, such that the tools and/or torches can be exchanged without any current flowing to the torch or any voltages being present at the tool head or at the torch (e.g., current or voltage in the circuit below or above certain current and/or voltage thresholds. This provides the advantage of protecting items, such as welding consumable, from damage, such as from blowback effects. However, such modes are not automatic, and may be overlooked by a busy operator. Even if implemented without operator involvement, such modes would not alert an operator of a potential completed circuit condition (e.g., an estimated or expected completed circuit condition) in every instance.

In some examples, the system may generate an output having a predetermined amount of current (e.g., a low or limited power output, such as approximately 5 amps) for a predetermined period of time (e.g., approximately 2 milliseconds), and apply this output to the circuit, cabling, tool, etc., to be checked. The current is applied for a short period of time and monitored for changes in the current, voltage, inductance, etc., of the investigated circuit. For example, if, during the circuit check period, a voltage increases beyond a certain threshold voltage level, the system may determine that no completed circuit condition exists or potentially exists. In some examples, a second and/or subsequent check may validate that no completed circuit condition exists or may confirm that a completed circuit condition exists, based on a change in the measured voltage, for example. The system may then alert the operator that no completed circuit condition exists, and allow the operator to proceed with the desired process and/or tool transition. The system may also, for example, automatically adjust system parameters in order to ensure proper operation of the power supply. For example, the system may automatically shut down the flow of the current to the tool head or to the torch if it determines that a completed circuit is present. In this manner, the system ensures that the process of changing the tool head or the torch is performed only when a completed circuit condition is not present.

In some examples, the system receives an input from the operator to provide a full output or welding-type power (e.g., initiate a welding process employing a high current power output, and/or increase the amount of output power). The system performs a completed circuit check to determine whether a completed circuit condition exists. Based on the determination, the system provides an alert and/or a feedback signal as to whether a completed circuit condition exists prior to delivering a power output. The operator may be prompted to provide the system with one or more confirming inputs, and/or take corrective action, before the system delivers power to the tool head or to the torch, such as when a completed circuit condition is identified. In the event the control circuitry determines a completed circuit condition does not exist, the system is configured to deliver the commanded power output and proceed to weld.

In some examples, the system delivers a predetermined amount of test current to the tool head or to the torch and continuously checks the voltage. If the voltage reaches a predetermined voltage level, for example, then the system determines that no completed circuit condition exists and, accordingly, the system proceeds to weld. The system may also automatically make adjustments to the system welding parameters based on the voltage level detected.

In some examples, the system may determine whether a completed circuit condition exists by increasing the current level over time. The increase can be gradually and continuously increased and/or incremented by fixed or changing amounts. In some examples, the output current is provided in steps, such that a first current level is reached, the system monitors the welding parameters for a predetermined amount of time and, if no completed circuit condition is determined, proceeds to a second current level to monitor the welding parameters for a second predetermined amount of time.

In some examples, the welding parameters are monitored and/or measured continuously or periodically. Through this process, voltage is monitored for an indication of a change in the voltage level. For example, a voltage drop by a predetermined amount may indicate a completed circuit condition. The predetermined amount may be a particular level (e.g., to a null or zero voltage) or may be a particular threshold voltage (e.g., a percentage or offset of the highest voltage amount reached during the circuit check). For example, if the system detects that the voltage has dropped by approximately 10% from a particular voltage level (e.g., approximately 30 volts) then the system may determine a completed circuit condition exists and provide an alert to the operator and/or adjust system parameters. The completed circuit condition may exist due to various reasons, such as a break in the insulation of the wires. In some examples, a completed circuit condition exists because the tool, the contact tip, the tip of the electrode wire and/or the torch is in contact with or adjacent to the workpiece or other return pathway at the time that a tool and/or process transition is underway and/or a process parameter is being adjusted.

In some examples, it is conceivable to apply a similar electrode stuck logic at process changeover. For example, the system may apply limited output power circuits and algorithms at a process change over. The system may also apply a signal (e.g., a pulse or pulsed output) to the power outlet at process changeover to detect a possible unintended current path. In some examples, the system monitors the signal for a period of time before a full power output (e.g., a high current welding-type power output) is provided for execution of the selected welding process.

In disclosed examples, a welding system includes a power source configured to deliver power via one or more power outlets and control circuitry. The control circuitry is configured to receive an input to initiate a welding process, command the power source to deliver a power signal with a current below a threshold level, monitor one or more characteristics of the power signal at the one or more power outlets, determine whether a completed circuit or an open circuit condition exists based on the monitored one or more characteristics, and to control the power source to prevent delivery of power if a completed circuit condition exists.

In some examples, the one or more characteristics of the power includes a voltage, the control circuitry configured to measure the voltage and determine a completed circuit condition exists when a measured voltage value decreases by more than a threshold amount. In examples, the control circuitry generates an alert when a completed circuit condition exists.

In some examples, the control circuitry delivers the power signal as one or more pulses, and the control circuitry is further configured to change a voltage or current level of the power signal incrementally with each successive pulse. In examples, the control circuitry controls the power source to deliver each pulse of the one or more pulses with a current of 5 amps for 500 milliseconds.

In some examples, the control circuitry determines the power voltage or current level has reached a predetermined voltage or current level and determines an open circuit condition exists in response to the measured voltage or current value not decreasing by more than the threshold amount. In examples, the predetermined voltage level is less than 50 volts.

In examples, the control circuitry controls the power source to deliver welding power for the welding process in response to the controller validating that an open circuit condition exists. In some examples, the control circuitry monitors the power signal at a first time, and monitors the power signal at a second time during a time period. In some examples, the power source includes a switched-mode power supply. In examples, the welding process type includes one or more of a metal inert gas (MIG), pulsed MIG, or a gas tungsten arc welding (GTAW) welding process.

In some examples, the welding process includes one of turning on the power source or switching from a first welding process to a second welding process.

In some disclosed examples, a welding system includes a power source configured to deliver power via one or more power outlets and control circuitry. The control circuitry receives an input to initiate a welding process, commands the power source to deliver welding-type power, monitors one or more characteristics of the welding-type power at the one or more power outlets at a first time, monitors the one or more characteristics of the welding-type power at a second time after a time period, determines whether a completed circuit or an open circuit condition exists based on a rate of change of the monitored one or more characteristics during the time period, and controls the power source to prevent delivery of power if a completed circuit condition exists.

In some examples, the control circuitry accesses a list of values corresponding to a rate of change of one or more characteristics corresponding to a completed circuit condition or an open circuit condition, compares the rate of change of the monitored one or more characteristics to the list of values, and determines whether a completed circuit or an open circuit condition exists based on the comparison.

In examples, the one or more characteristics of the power includes a voltage and a current. In some examples, the control circuitry calculates a voltage-current curve based on the monitored one or more characteristics to the list of values, compares the calculate a voltage-current curve to a list of values that associate calculate a voltage-current curves to completed circuit conditions, and determines whether a completed circuit exists based on the comparison.

In some examples, the welding-type power is output with a current of at least 50 amps. In some examples, the control circuitry determines a voltage has reached a predetermined voltage level, and determines a closed circuit condition exists in response to the measured voltage decreasing by greater than a predetermined threshold amount.

In examples, the control circuitry determines a voltage has reached a predetermined voltage level, and determines a closed circuit condition exists in response to the measured voltage decreasing by greater than a predetermined threshold rate of change.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include power limiting circuitry, output selection circuitry, measurement and/or control circuitry, and/or any other circuits to provide appropriate features.

As used herein, the terms "first" and "second" may be used to enumerate different components or elements of the same type, and do not necessarily imply any particular order. For example, while in some examples a first time occurs prior to a second time within a time period, the terms "first time" and "second time" do not imply any specific order in which the first or second times occur relative to the other within the time period.

The term "welding-type system," as used herein, includes any device capable of supplying power suitable for welding, plasma cutting, induction heating, Carbon Arc Cutting-Air (e.g., CAC-A) and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, cutting process, and/or any other type of welding process.

As used herein, the term "welding program" includes at least a set of welding parameters for controlling a weld. A welding program may further include other software, algorithms, processes, or other logic to control one or more welding-type devices to perform a weld.

Turning now to the drawings, FIG. 1A is a block diagram of an example welding system 100 having a welding-type power supply 102, a wire feeder 104, a gouging or cutting tool 107, and a welding torch 106. The welding system 100 powers, controls, and supplies consumables to a welding application. In some examples, the power supply 102 directly supplies input power to the welding torch 106. The welding torch 106 may be a torch configured for shielded metal arc welding (SMAW, or stick welding), gas tungsten arc welding (GTAW), gas metal arc welding (GMAW), or flux-cored arc welding (FCAW), based on the desired welding application.

In the illustrated example, the power supply 102 is configured to supply power to the wire feeder 104, and the wire feeder 104 may be configured to route the input power to the welding torch 106. In addition to supplying an input power, the wire feeder 104 may supply a filler metal to a welding torch 106 for various welding applications (e.g., GMAW welding, flux core arc welding (FCAW)). While the example system 100 of FIG. 1A includes a wire feeder 104 (e.g., for GMAW or FCAW welding), the wire feeder 104 may be replaced by any other type of remote accessory device, such as a stick welding and/or GTAW welding remote control interface that provides stick and/or GTAW welding.

The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on a weld voltage setpoint and outputs the welding-type power via a weld circuit.

In some examples, the power conversion circuitry 110 is configured to convert the primary power 108 to both welding-type power and auxiliary power outputs. However, in other examples, the power conversion circuitry 110 is adapted to convert primary power only to a weld power output, and a separate auxiliary converter is provided to convert primary power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The power supply 102 includes control circuitry 112 to control the operation of the power supply 102. The power supply 102 also includes a user interface 114. The control circuitry 112 receives input from the user interface 114, through which a user may choose a process and/or input desired parameters (e.g., voltages, currents, particular pulsed or non-pulsed welding regimes, and so forth). The user interface 114 may receive inputs using one or more input devices 115, such as via a keypad, keyboard, physical buttons, a touch screen (e.g., software buttons), a voice activation system, a wireless device, etc. Furthermore, the control circuitry 112 controls operating parameters based on input by the user as well as based on other current operating parameters. Specifically, the user interface 114 may include a display 116 for presenting, showing, or indicating, information to an operator. The control circuitry 112 may also include interface circuitry for communicating data to other devices in the system 100, such as the wire feeder 104. For example, in some situations, the power supply 102 wirelessly communicates with other welding devices within the welding system 100. Further, in some situations, the power supply 102 communicates with other welding devices using a wired connection, such as by using a network interface controller (NIC) to communicate data via a network (e.g., ETHERNET, 10baseT, 10base100, etc.). In the example of FIG. 1A, the control circuitry 112 communicates with the wire feeder 104 via the weld circuit via a communications transceiver 118, as described below.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, deposition rate, wire feed speed, puddle fluidity, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding related data, detect short circuit parameters, determine amount of spatter) during operation. One or more lists or look up tables may be provided, and/or network connections to various databases available to inform decision-making.

In some examples, the welding power flows from the power conversion circuitry 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage). Furthermore, in some examples, welding data is provided with the weld cable 126 such that welding power and weld data are provided and transmitted together over the weld cable 126. The communications transceiver 118 is communicatively coupled to the weld cable 126 to communicate (e.g., send/receive) data over the weld cable 126. The communications transceiver 118 may be implemented using serial communications (e.g., full-duplex RS-232 or RS-422, or half-duplex RS-485), network communications (e.g., Ethernet, PROFIBUS, IEEE 802.1X wireless communications, etc.), parallel communications, and/or any other type of communications techniques. In some examples, the communications transceiver 118 may implement communications over the weld cable 126.

The example communications transceiver 118 includes a receiver circuit 121 and a transmitter circuit 122. Generally, the receiver circuit 121 receives data transmitted by the wire feeder 104 via the weld cable 126 and the transmitter circuit 122 transmits data to the wire feeder 104 via the weld cable 126. The communications transceiver 118 enables remote configuration of the power supply 102 from the location of the wire feeder 104, and/or command and/or control of the wire feed speed output by the wire feeder 104 and/or the weld power (e.g., voltage, current) output by the power supply 102. In some examples, the communications are transmitted via a dedicated cable between components and/or wireless communications channels, as well as other suitable communications devices and/or techniques.

The example wire feeder 104 also includes a communications transceiver 119, which may be similar or identical in construction and/or function as the communications transceiver 118. While communication over a separate communications cable is illustrated in FIG. 1A, other communication media, such as wireless media, power line communications, and/or any other communications media, may be used.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 134 or 112 to enable, inhibit, or control gas flow (e.g., shielding gas) through the valve 130. Shielding gas exits the valve 130 and flows through a cable 132 (which in some implementations may be packaged with the welding power output) to the wire feeder 104, which provides the shielding gas to the welding application. In some examples, the welding system 100 does not include the gas supply 128, the valve 130, and/or the cable 132.

In some examples, the wire feeder 104 uses the welding power to power the various components in the wire feeder 104, such as to power a wire feeder controller 134. As noted above, the weld cable 126 may be configured to provide or supply the welding power. The power supply 102 may also communicate with a communications transceiver 119 of the wire feeder 104 using the weld cable 126 and the communications transceiver 118 disposed within the power supply 102. In some examples, the communications transceiver 119 is substantially similar to the communications transceiver 118 of the power supply 102. The wire feeder controller 134 controls the operations of the wire feeder 104. In some examples, the wire feeder 104 uses the wire feeder controller 134 to detect whether the wire feeder 104 is in communication with the power supply 102 and to detect a current welding process of the power supply 102 if the wire feeder 104 is in communication with the power supply 102.

In examples, the power supply 102 delivers a power output directly to torch 106 without employing any contactor. In such an example, power regulation is governed by the control circuitry 112 and/or the power conversion circuitry 110. In some examples, a contactor is employed.

The wire feeder 104 includes a wire drive 136 that receives control signals from the wire feeder controller 134 to drive rollers 138 that rotate to pull wire off a spool 140 of wire. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106. In some examples, one or more sensors 127 are included with or connected to in the wire feeder 102 to monitor one or more welding parameters (e.g., power, voltage, current, wire feed speed, etc.) to inform the controller 134 during the welding process. In some examples, one or more sensors are included in the welding power supply 102.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146. In some examples, one or more sensors 147 are included with or connected to the welding torch 106 to monitor one or more welding parameters (e.g., power, voltage, current, wire feed speed, etc.) to inform the controller 134 and/or 112 during the welding process. Although illustrated with the torch 106 (e.g., a welding tool, as described herein) connecting through wire feeder 104, in some examples the welding tool can connect directly to the welding power supply 102. For instance, a gouging and/or cutting tool may connect directly to studs or another power outlet of the welding power supply 102. In some examples, a wire feeder is integrated with the power supply, and studs or other power outlets are provided on the housing of such an integrated enclosure.

Figure 1B:
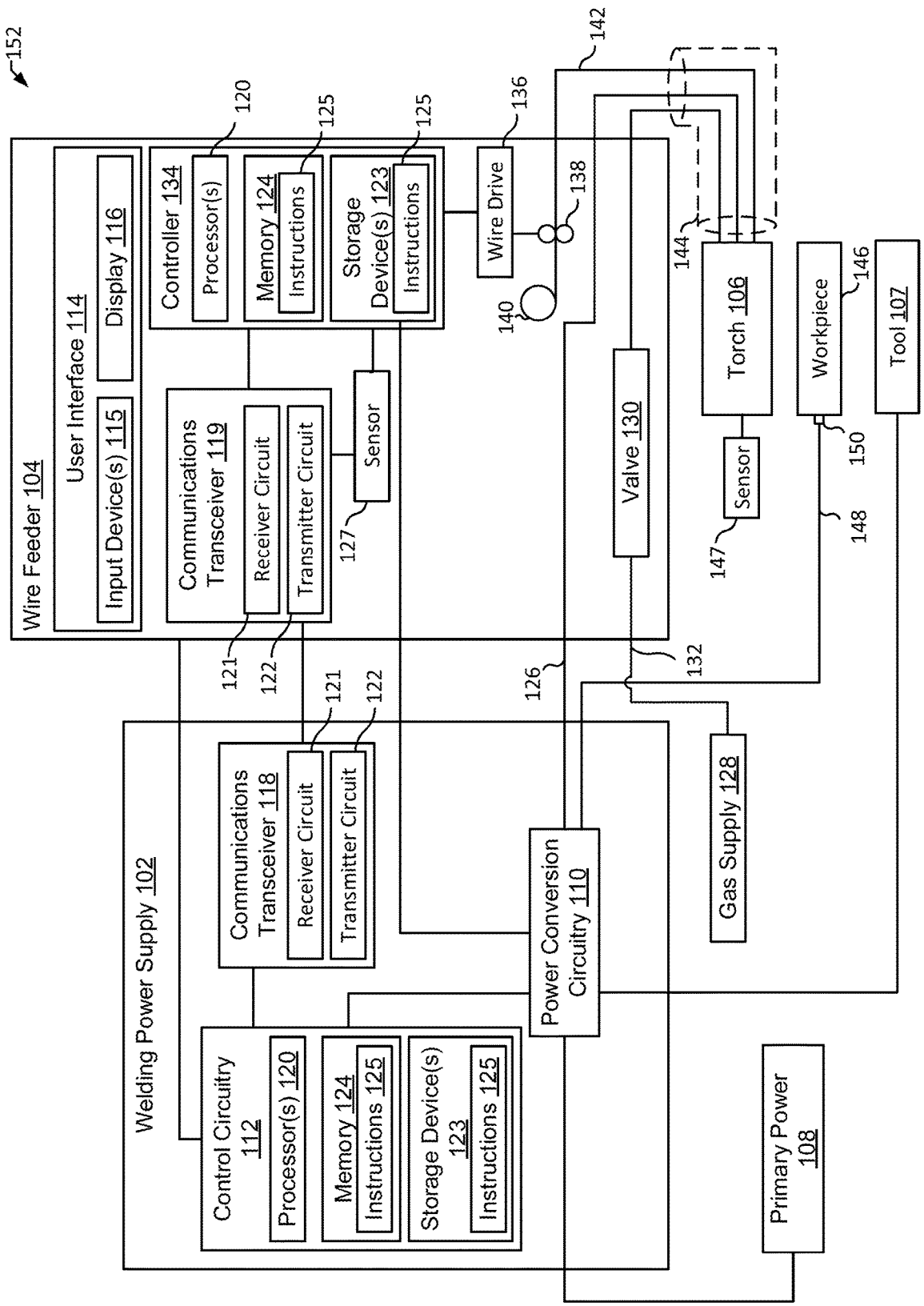
FIG. 1B is a schematic diagram of another example welding system including a power supply and a wire feeder, in accordance with aspects of this disclosure.

FIG. 1B is a schematic diagram of another example welding system 152 in which the wire feeder 104 includes the user interface 114 in addition to or as an alternative to the user interface on the welding power supply 102. In the example of FIG. 1B, the control circuitry 134 of the wire feeder 104 implements the determinations of the welding program and welding parameters which are described with reference to the control circuitry 112 of FIG. 1A.

Figure 1C:
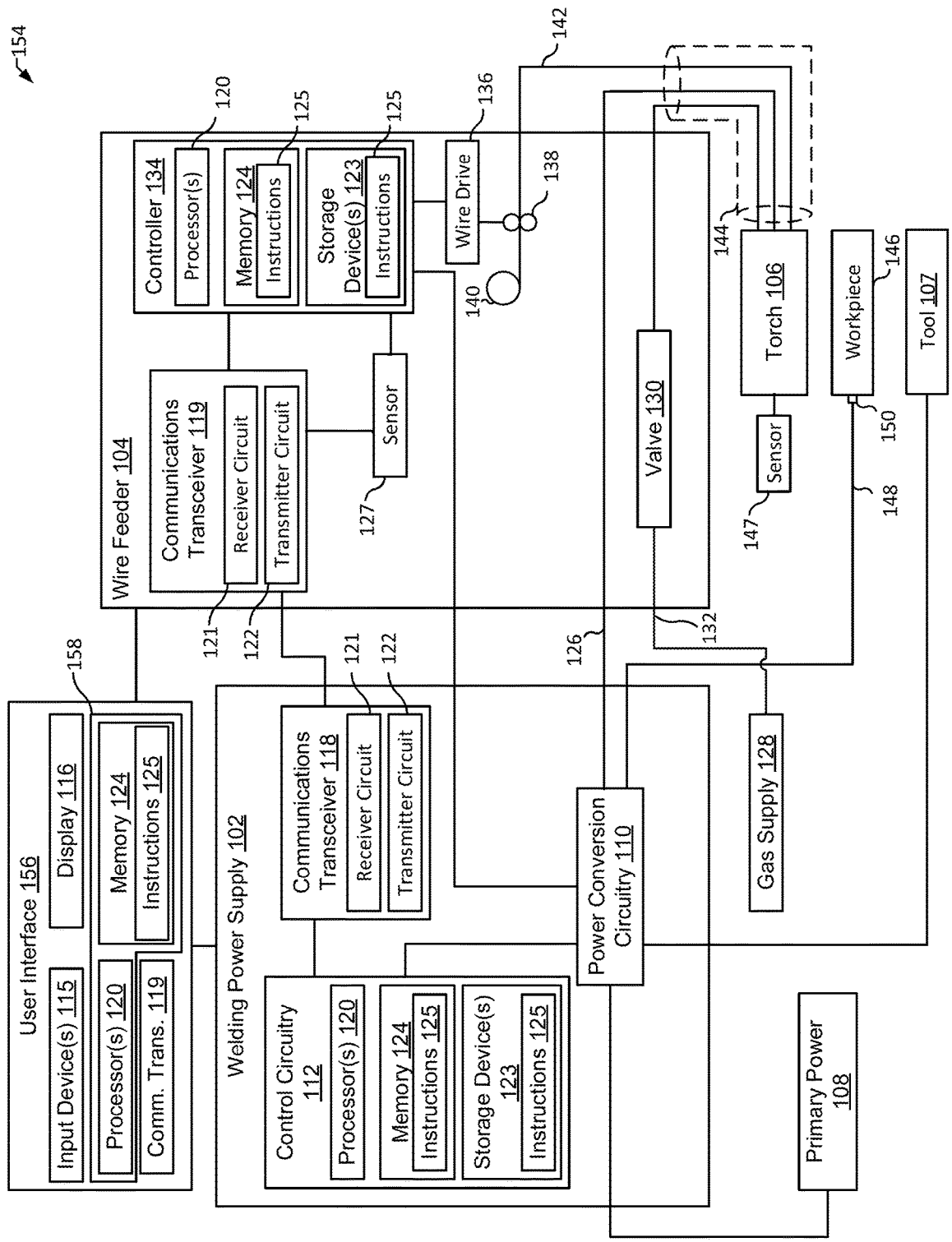
FIG. 1C is a schematic diagram of another example welding system including a welding power supply and a wire feeder, in accordance with aspects of this disclosure.

FIG. 1C is a schematic diagram of another example welding system 154 including a separate user interface 156. The user interface 156 is a separate device, and may be connected to the welding power supply 102 and/or to the wire feeder 104 to provide commands and/or control information. The example user interface 156 includes the input devices 115 and the display 116, and includes control circuitry 158. The example control circuitry 158 includes the processor(s) 120 and the memory 124 storing the instructions 125. The example user interface 156 further includes a communications transceiver 119 to enable communications between the user interface 156 and the welding power supply 102 and/or the wire feeder.

Figure 1D:
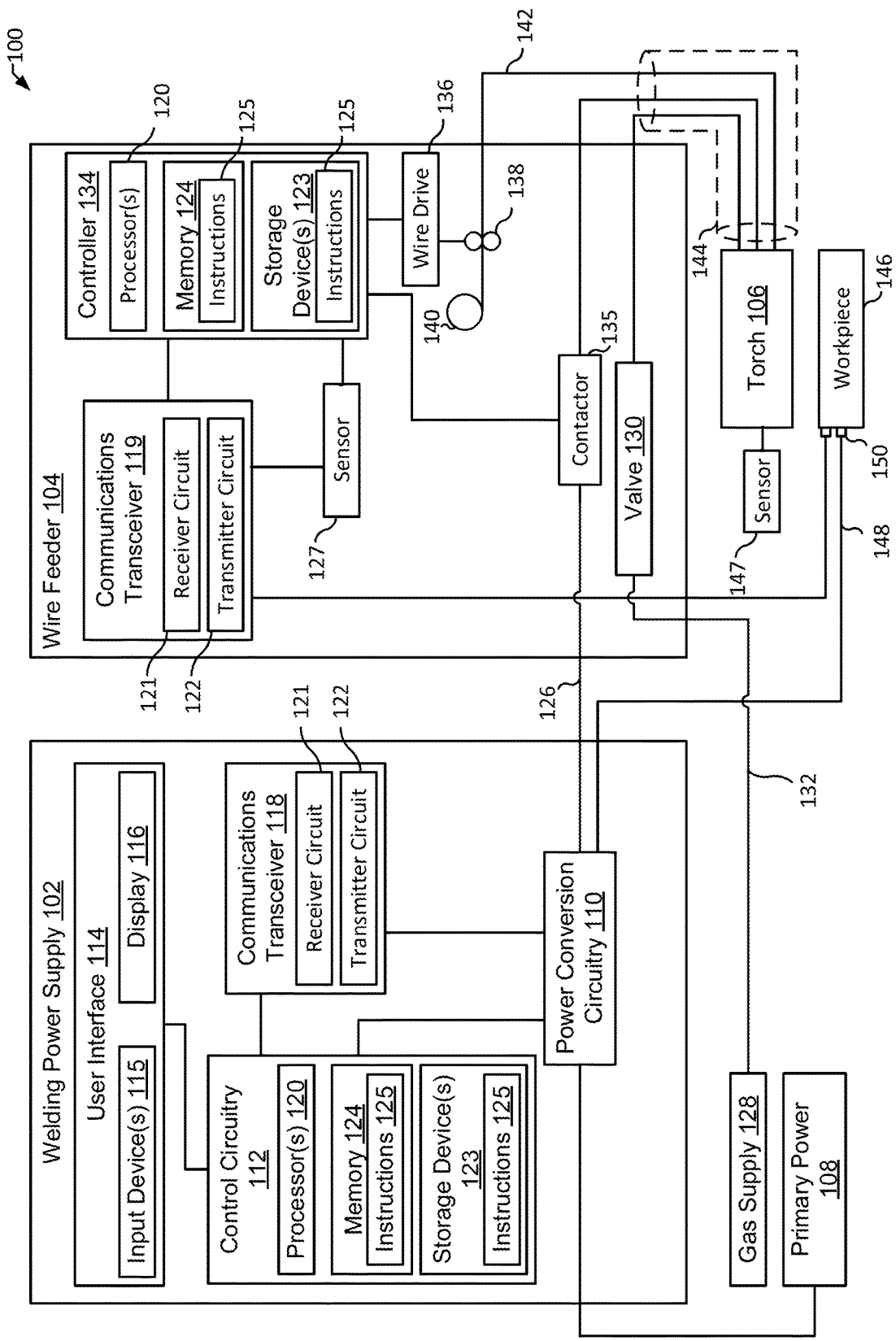
FIG. 1D is a schematic diagram of another example welding system including a welding power supply and a wire feeder employing a contactor, in accordance with aspects of this disclosure.

FIG. 1D is a block diagram of an example welding system 100 having a welding-type power supply 102, a wire feeder 104, and a welding torch 106. The welding system 100 powers, controls, and supplies consumables to a welding application. In some examples, the power supply 102 directly supplies input power to the welding torch 106.

In the example of FIG. 1D, a contactor 135 (e.g., high amperage relay) is employed, and controlled by the wire feeder controller 134 and configured to enable or inhibit welding power to continue to flow to the weld cable 126 for the welding application (such as a volt-sensing type wire feeder). In some examples, the contactor 135 is an electromechanical device. However, the contactor 135 may be any other suitable device, such as a solid-state device. The wire feeder 104 includes a wire drive 136 that receives control signals from the wire feeder controller 134 to drive rollers 138 that rotate to pull wire off a spool 140 of wire. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106. In some examples, the contactor 135 is omitted and output or welding-type power is initiated and stopped by the power supply 102 without employing a contactor 135. In some examples, one or more sensors 127 are included with or connected to in the wire feeder 102 to monitor one or more welding parameters (e.g., power, voltage, current, wire feed speed, etc.) to inform the controller 134 during the welding process. In some examples, one or more sensors are included in the welding power supply 102.

Although FIGS. 1A-1D are illustrated as having a user interface (114, 156) incorporated with a particular system, the illustration is exemplary such that one or more of the interfaces disclosed herein as well as additional user interfaces may be incorporated in one or more of the example welding systems disclosed herein.

Figure 2:
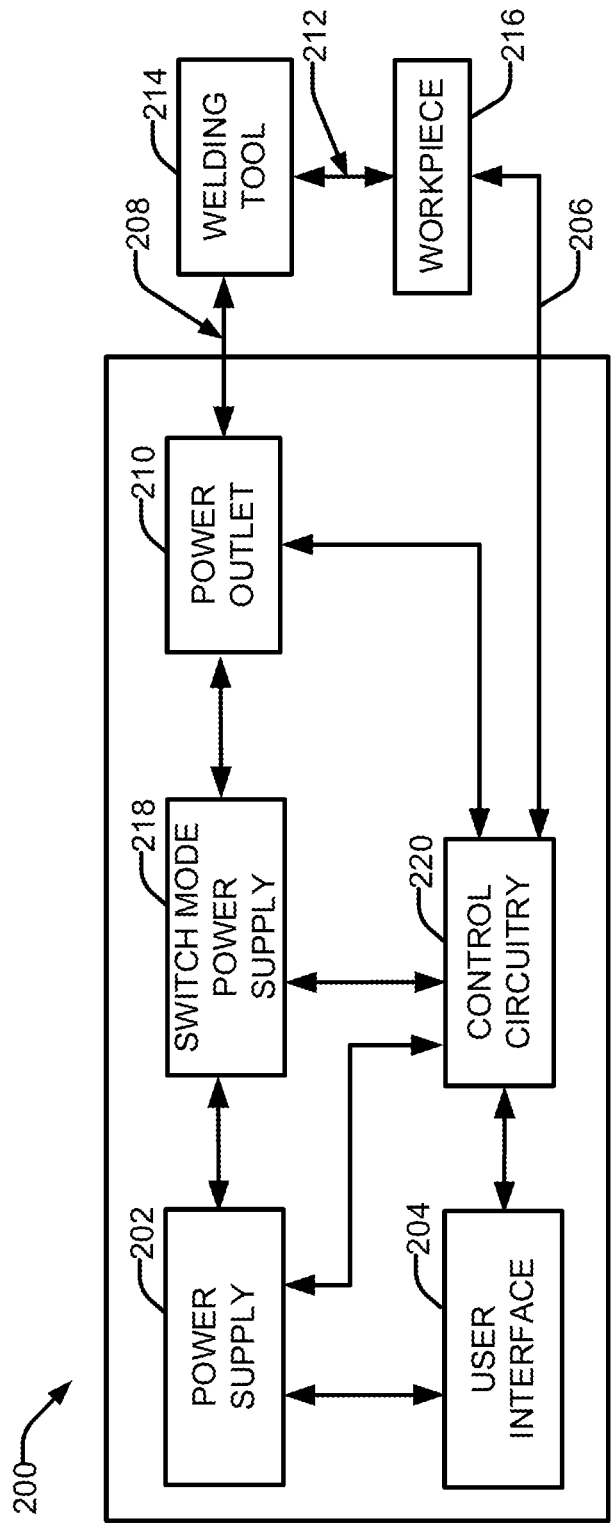
FIG. 2 illustrates a diagram of an example system that may be used to implement an example completed circuit checking process.

FIG. 2 illustrates a diagram of an example welding system 200 that may be used to implement an example completed circuit checking process. The example welding system 200 may include apparatuses and methods for a completed circuit testing process. For example, welding system 200 may represent a diagrammatic illustration of one or more components described with respect to welding system 100 provided in FIGS. 1A-1D, or may be a separate welding system operating independently and/or in connection with welding system 100. In some examples, the welding system 200 includes a user interface 204, which may be used to replace and/or supplement interface(s) 114, 152, 154, disclosed with respect to FIGS. 1A-1D.

In the example of FIG. 2, the welding system 200 includes a power supply 202 to deliver power via one or more power outlets 210 to a welding tool 214 connected by one or more cables 208. The example weld cable 208 is attachable and detachable from power outlet 210, which may include weld studs. During a completed circuit check, all components that carry current may be investigated, including the output 210, the cable 208, the welding tool 214, a workpiece 216, a return cable 206, and so forth. The system 200 includes control circuitry 220 to receive an input from the user interface 204 to provide controls to the welding system 200 as well as provide alerts to an operator. Although illustrated with the welding tool 214 (e.g., a welding tool, such as a torch, cutting tool, etc., as described herein) connecting directly to the welding power supply 102, in some examples the welding tool 214 can connect through a wire feeder (e.g., wire feeder 104). In some examples, a wire feeder is integrated with the power supply, and studs or other power outlets are provided on the housing of such an integrated enclosure.

As disclosed herein, the control circuitry 220 initiates a welding process and commands the power supply 202 to deliver a power signal with a current below a threshold level (e.g., a low power output having a predetermined amount of current). The control circuitry 220 monitors one or more characteristics of the power signal at the one or more power outlets 210 and the control circuitry 220 determines whether a completed circuit or an open circuit condition exists. The control circuitry performs this determination based on the information obtained through monitoring of the one or more power signal characteristics (e.g., voltage, current, etc.). The control circuitry 220 may also control the power source to prevent delivery of power if a completed circuit condition exists. In some examples, the control circuitry 220 measures a voltage associated with the power signal and determines whether a completed circuit condition exists based on changes in the voltage. For example, when a measured value of the voltage decreases by more than a threshold amount, the control circuitry 220 determines a completed circuit condition exists and responds accordingly. In some examples, changes in the measured current may indicate a completed circuit condition exists, such as an increase above a predetermined threshold current amount and/or a dramatic rise in the current. For instance, the control circuitry 220 may generate an alert and/or prevent power output in response to a completed circuit condition.

In some examples, the control circuitry 220 delivers the power signal as one or more pulses, and the control circuitry 220 may be configured to change a voltage or current level of the power signal incrementally with each successive pulse. The control circuitry 220 may, for example, control the power source to deliver each pulse, and each pulse may be one of a series of pulses, with a predetermined current level (e.g., approximately 5 amps) for a predetermined time duration (e.g., approximately 500 milliseconds). The predetermined time duration is selected to ensure that the power signal being monitored is sufficient to be measured. In other words, if a short and/or low power signal is outputted, a high resistance within the circuit may delay or otherwise distort the signal before it is measured. If a monitoring period is too short, the control circuitry 220 may not detect changes in the power characteristics.

In some examples, the measured values of the power characteristics are compared against a list of values (e.g., stored in the storage device 123 and/or memory device 124) corresponding to values of the one or more characteristics that correspond to a completed circuit condition or an open circuit condition. The stored values may be calculated, determined empirically, and/or set by a welding process or operator. Thus, during the monitoring period, the control circuitry 220 is configured to compare the values of the monitored power characteristics to the list of values. Based on the comparison, the control circuitry 220 determines whether a completed circuit or an open circuit condition exists. The accessed values may correspond to absolute values of the measured characteristics (e.g., a predetermined value), and/or a rate of change of the values over time.

In disclosed examples, the control circuitry 220 receives a command to output welding-type power (e.g., approximately 50 amps or greater). In response, the control circuitry 220 delivers the requested power output via the power outlet 210. In some examples, the control circuitry 220 then monitors the welding power characteristics (e.g., voltage and/or current) to determine whether a completed circuit condition or an open circuit condition exists. The monitoring can be implemented as a periodic check, a continuous cycle of measurement and analysis, and/or for a predetermined amount of time. As described herein, the control circuitry 220 determines whether the value and/or changes in the welding power characteristics indicate a completed and/or open circuit condition exists and proceeds accordingly. In the event the control circuitry determines a completed circuit condition does not exist, the system 200 outputs the commanded power.

In some examples, the control circuitry 220 determines when the voltage level and/or current level has reached a predetermined voltage and/or current level. The control circuitry 220 then determines whether an open circuit condition exists if the measured voltage does not decrease by more than a threshold amount (e.g., approximately 50 volts) or percentage (e.g., approximately 10%), and/or the current value does not increase by more than a threshold amount (e.g., approximately 2 amps) or percentage (e.g., approximately 10%). In some examples, regardless of the highest voltage amount reached, if the measured voltage drops to zero or near zero, the control circuitry 220 determines a completed circuit condition to exist.

In some examples, the control circuitry 220 may control the power supply 202 to deliver welding power for the welding process in response to the control circuitry 220 validating that an open circuit condition exists. The open circuit may be, for example, between the welding tool 214 and the workpiece 216 in the space indicated in FIG. 2 by numerical indicator 212. In some examples, the power supply 202 may include a plurality of power outlets 210 (e.g., each with dedicated weld studs, cabling, attached welding tool, workpiece, and/or return cable), configured to deliver power to each power outlet 210 selectively. The control circuitry 220 monitors the power characteristics of each power outlet 210 independently of the other power outlets 210, and may determine whether a completed circuit condition exists on each monitored power outlet.

In some examples, the control circuitry 220 monitors the power signal at a first time at the beginning of a predetermined time period, and then monitors the power signal a second time at the conclusion of a predetermined time period. The two measurements may be compared to determine if the change in welding parameter indicates a completed circuit condition exists. For instance, a decrease in voltage (or an increase in current) at a fast rate, even when the values do not exceed predetermined thresholds and/or percentage amounts, may indicate a completed circuit condition exists. In some examples, a dramatic change over a given time period may alert the operator that a potential for a completed circuit condition exists, with or without disabling or preventing a weld output power.

In some examples, the power source of the welding system 200 includes a switched-mode power supply 218 (e.g., a power inverter). The control circuitry 220 may monitor a change in the switched-mode power supply 218 output and activate and/or adjust the monitoring process at the power outlet 210. For example, if the switched-mode power supply 218 indicates an increase in power output, the control circuitry 220 may reevaluate the power characteristics at the power outlet 210 to determine whether a completed circuit condition exists.

Figure 3:
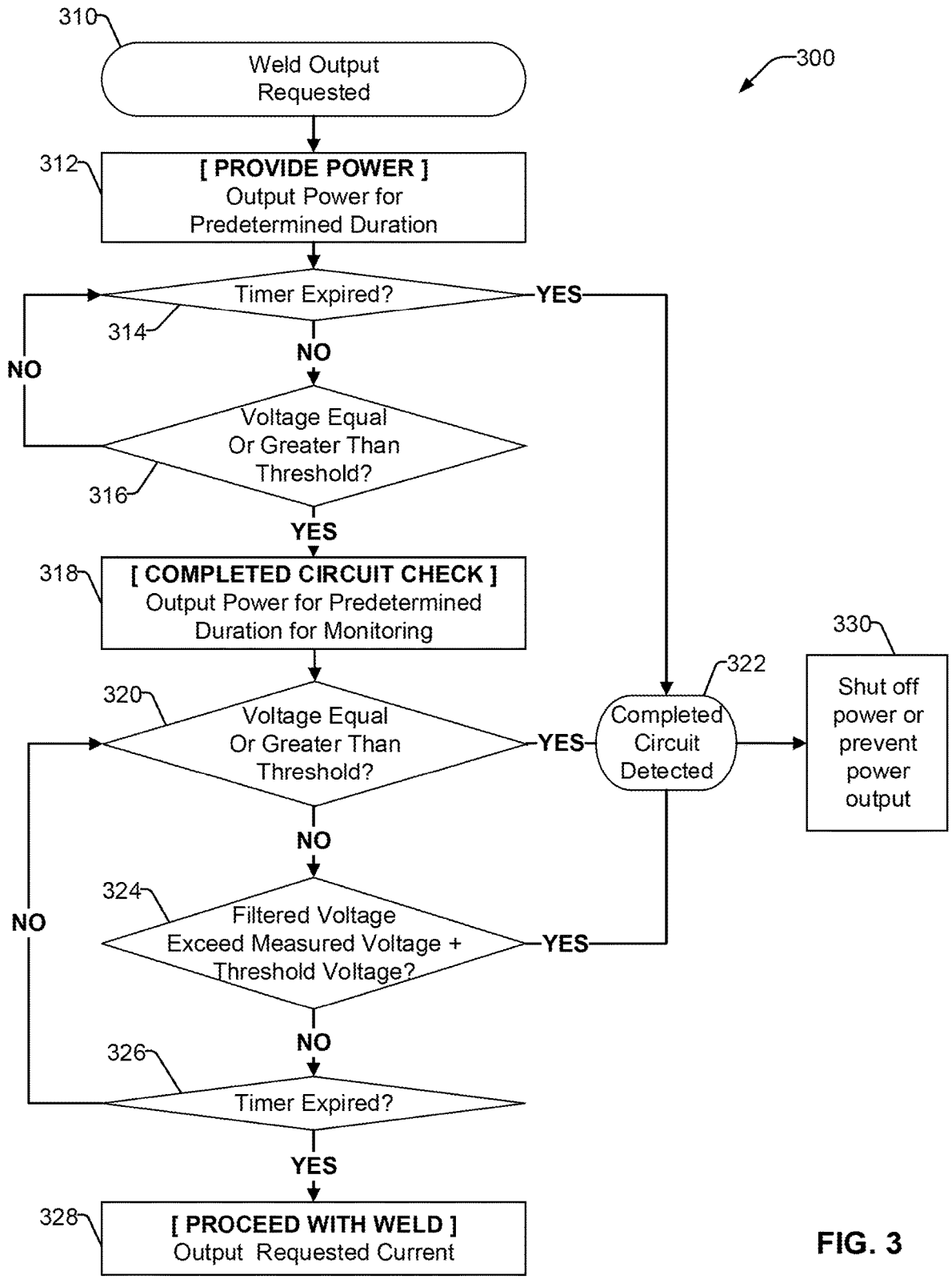
FIG. 3 provides a flowchart representative of example machine-readable instructions, which may be executed by the example system of FIGS. 1A-2 to implement an example, completed circuit checking process.

FIG. 3 illustrates a flow chart 300 depicting an example method implemented on the system(s) 100, 200 to check for a completed circuit condition. In block 310, an input is received by the control circuitry indicating that weld output is requested for a certain welding-type process and/or welding-type tool. The input may be part of a weld sequence routine and/or provided by an operator via a user interface.

Additionally or alternatively, the control circuitry may receive information regarding one or more of the type of tool to transition from or transition to, and/or other information related to the desired transition. In some examples, the control circuitry receives information regarding the desired type of completed circuit test (e.g., a check at system start-up, a pulsed routine, a periodic routine, a continuously monitored routine, etc.).

At block 312, the system may regulate the open circuit voltage parameter, such as by generating a power output. For example, the power output can increase until the current level reaches a predetermined level (e.g., approximately 5 amps). The system may set a predetermined monitoring period (e.g., approximately 2 milliseconds). At block 314, the system determines whether the predetermined monitoring period or timer has expired. If the system determines that the time has expired, the method proceeds to block 322 and determines that a completed circuit condition (e.g., a shorted weld output) has been detected and then proceeds to block 330 to terminate power output (e.g., prevent the flow of current or shut-off the system).

However, if at block 314 the system determines that the time has not expired, the system may proceed to block 316 to determine if the voltage has reached a predetermined threshold level, such as approximately 50 volts. If at block 316 the control circuitry determines that the voltage has not reached the predetermined threshold level, then the returns to block 314 and continues to monitor the timer. If the control circuitry determines at block 316 that the voltage has reached or exceeded the predetermined threshold level, the control circuitry proceeds to block 318 to perform a completed circuit check process. For instance, the current is set to a predetermined amount (e.g., approximately 5 amps) and the monitoring duration to a predetermined time (e.g., approximately 0.5 seconds).

At block 320, the control circuitry measures the voltage. If the voltage level has exceeded a predetermined threshold value (e.g., approximately 27.5 volts), the method proceeds to block 322, indicating that a shorted weld output has been detected and proceed to block 330 and terminate any power output. The control circuitry may take other corrective and/or preventive actions in response to a completed circuit condition.

If, at block 320, the system determines that the voltage has not reached the predetermined threshold voltage level, the method proceeds to block 324 to monitor the voltage output. For example, the voltage may be filtered over an approximate 1 millisecond period to determine if the voltage has exceeded a predetermined threshold voltage (e.g., approximately 10 volts) over the desired voltage level. If the filtered voltage has exceeded the predetermined threshold voltage, the method proceeds to block 322, determines that a completed circuit condition has been detected, and proceeds to block 330 at which point the system may turn off the flow of current.

If the filtered voltage has not exceeded the predetermined threshold voltage, the method proceeds to block 326, where the control circuitry monitors the timer. If the timer has not expired, the method returns to block 320 to monitor the output voltage. However, if at block 326 the control circuitry determines that the timer has expired and a completed circuit condition has not been detected, the method proceeds to block 328 and proceeds to output power in accordance with the commanded welding process.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system, comprising:
   a power source configured to deliver power via one or more power outlets;
   control circuitry configured to:
   receive an input to initiate a welding process;
   command the power source to deliver a power signal with a first current below a first threshold level from a welding power supply for a first predetermined time duration;
   monitor one or more characteristics of the power signal at the one or more power outlets, wherein the one or more characteristics includes a voltage;
   determine whether the voltage exceeds a first threshold voltage level within the first predetermined time duration;
   if the voltage exceeds the first threshold voltage level, command the power source to deliver the power signal with a second current below a second threshold level from the welding power supply for a second predetermined time duration;
   determine whether a completed circuit or an open circuit condition exists based on the voltage changing at a rate of change having a magnitude exceeding a threshold rate of change; and
   control the power source to prevent delivery of power if a completed circuit condition exists.

2. The welding system of claim 1, wherein the control circuitry is further configured to generate an alert when a completed circuit condition exists.

3. The welding system of claim 1, wherein the control circuitry is further configured to deliver the power signal as one or more pulses, and wherein the control circuitry is further configured to change a voltage or current level of the power signal incrementally with each successive pulse.

4. The welding system of claim 3, wherein the control circuitry is further configured control the power source to deliver each pulse of the one or more pulses with a current of 5 amps for 500 milliseconds.

5. The welding system of claim 1, wherein the power source is configured to output power with a current of at least 50 amps.

6. The welding system of claim 1, wherein the control circuitry is further configured to:
   determine the power voltage or current level has reached a predetermined voltage or current level; and
   determine an open circuit condition exists in response to the measured voltage or current value not decreasing by more than the threshold amount.

7. The welding system of claim 6, wherein the predetermined voltage level is less than 50 volts.

8. The welding system of claim 6, wherein the control circuitry is further configured to control the power source to deliver welding power for the welding process in response to the controller validating that an open circuit condition exists.

9. The welding system of claim 1, wherein the control circuitry is further configured to monitor the one or more characteristics of the power signal at a first time, and to monitor the one or more characteristics of power signal at a second time after a time period.

10. The welding system of claim 1, wherein the power source comprises a switched-mode power supply.

11. The welding system of claim 1, wherein a type of the welding process includes one or more of a metal inert gas (MIG), pulsed MIG, or a gas tungsten arc welding (GTAW) welding process.

12. The welding system of claim 1, wherein the welding process includes one of turning on the power source or switching from a first welding process to a second welding process.

13. A welding system, comprising:
   a power source configured to deliver power via one or more power outlets;
   control circuitry configured to:
   receive an input to initiate a welding process;
   command the power source to deliver welding-type power;
   monitor one or more characteristics of the welding-type power at the one or more power outlets at a first time to generate one or more first characteristic measurements;

monitor the one or more characteristics of the welding-type power at a second time to generate one or more second characteristic measurements;

compare the one or more first characteristic measurements to the one or more second characteristic measurements to determine whether a completed circuit or an open circuit condition exists based on a rate of change of the one or more characteristics during a time period starting at the first time and ending at the second time; and control the power source to prevent delivery of power if a completed circuit condition exists.

14. The welding system of claim 13, wherein the control circuitry is further configured to:

access a list of values corresponding to a rate of change of one or more characteristics corresponding to a completed circuit condition or an open circuit condition;

compare the rate of change of the monitored one or more characteristics to the list of values; and determine whether a completed circuit or an open circuit condition exists based on the comparison.

15. The welding system of claim 13, wherein the one or more characteristics of the power includes a voltage and a current.

16. The welding system of claim 15, wherein the control circuitry is further configured to:

calculate a calculated voltage-current curve based on the monitored one or more characteristics to a first list of values;

compare the calculated voltage-current curve to a second list of values that associates a plurality of voltage-current curves with completed circuit conditions; and determine whether the completed circuit exists based on the comparison.

17. The welding system of claim 13, wherein the welding-type power is output with a current of at least 50 amps.

18. The welding system of claim 13, wherein the control circuitry is further configured to:

determine a voltage has reached a predetermined voltage level; and determine the completed circuit condition exists in response to the voltage decreasing below a predetermined threshold amount.

19. The welding system of claim 13, wherein the control circuitry is further configured to:

determine a voltage has reached a predetermined voltage level; and determine the completed circuit condition exists in response to the measured voltage changing by greater than a predetermined threshold rate of change.

20. A welding system, comprising:

a power source configured to deliver power via one or more power outlets;

control circuitry configured to:

receive an input signal to initiate a welding process;

command the power source to deliver welding-type power for a first predetermined time duration;

measure an output voltage of the welding-type power at the one or more power outlets during the first predetermined time duration;

determine whether the output voltage is greater than a first threshold voltage level within the first predetermined time duration;

if the output voltage exceeds the first threshold voltage level, command the power source to deliver the welding-type power for a second predetermined time duration;

measure the output voltage of the welding-type power at a during the second predetermined time duration;

determine a completed circuit condition exists in response to the output voltage decreasing below a second threshold voltage level; and control the power source to prevent delivery of power if the completed circuit condition exists.

* * * * *